United States Patent Office

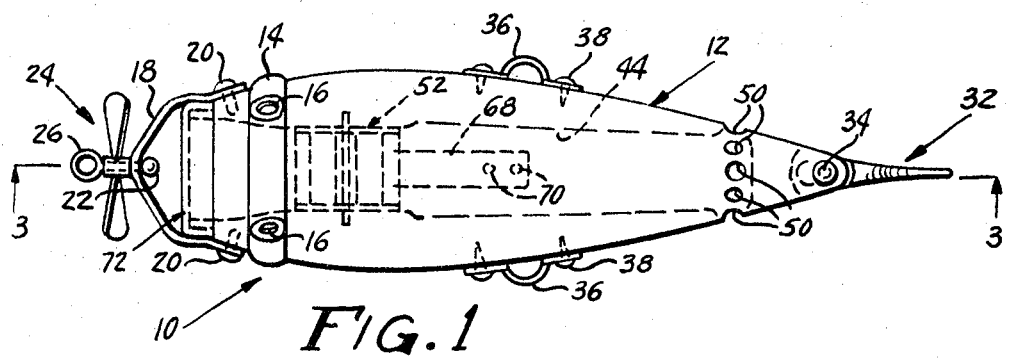
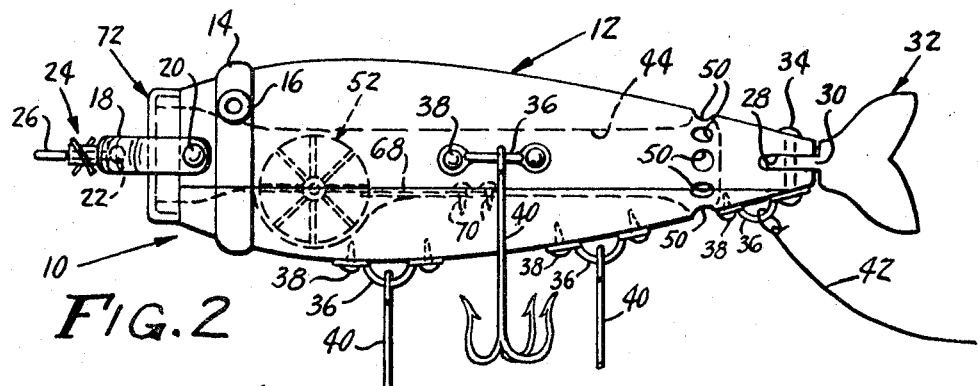
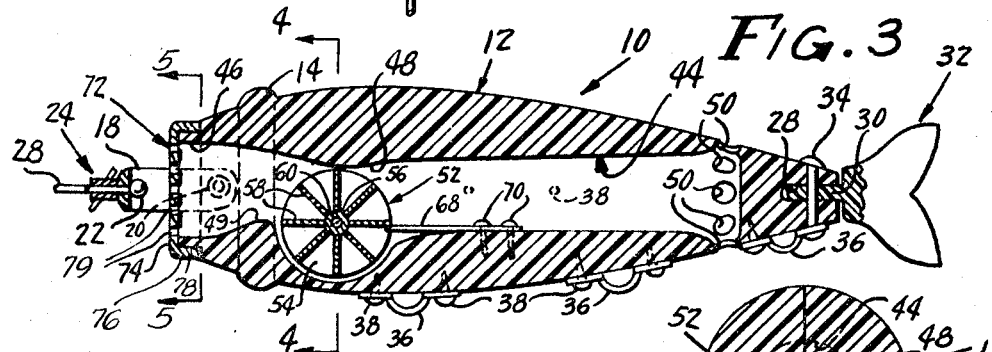
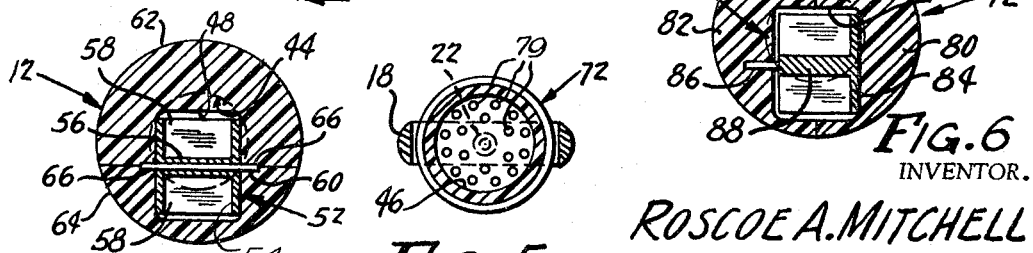

3,449,852
Patented June 17, 1969

---

3,449,852
SOUND EMITTING FISH LURE
Roscoe A. Mitchell, Box 95, Dover, Tenn. 37058
Filed Jan. 25, 1966, Ser. No. 522,983
Int. Cl. A01k 85/00
U.S. Cl. 43—42.06    4 Claims

ABSTRACT OF THE DISCLOSURE

A sound emitting fish lure is provided wherein a paddle wheel is located in a longitudinal substantially straight water passage through the lure body. A reed is positioned for contact with the paddle wheel whereby movement of the lure through water rotates the paddle wheel and vibrates the reed.

---

This invention relates to a sound emitting fish lure, and more particularly to a fish lure constructed with a minimum number of operating elements to emit sound therefrom for the attraction of fish.

Sound emitting fish lures are well known in the prior art but generally comprise an undue number of elements for producing the desired sound. One example of prior art sound emitting fish lures may be found in United States Patent No. 2,977,705 wherein the lure body forms a longitudinal passageway interiorly of which is rotatably mounted a longitudinally extending shaft carrying a propeller for driving the shaft and for rotating a corrugated wheel in contact with a resilient metal reed. The passage of water through the longitudinal passageway impacts the propeller thereby rotating the shaft and corrugated wheel to strum the metal reed. It will be apparent that a large number of components are necessary to produce the sound desired.

It is an object of the instant invention to provide a fishing lure which is constructed and arranged to produce a desired sound with a minimum number of sound producing elements.

Another object of the instant invention is to provide a fishing lure having a longitudinal passageway extending therethrough in which is mounted a vibratable reed directly in contact with a fan or propeller.

Still another object of the instant invention is the provision of a fishing lure provided with a paddle wheel journalled transversely of a longitudinally extending passageway with the paddle wheel intermittnetly contacting a vibratable reed thereby producing sound when the lure is drawn through the water.

Still another object of the instant invention is to provide a fishing lure equipped to produce a sound when drawn through the water which is inexpensive to manufacture and simple and which is durable and long lasting because of its simplified construction.

Still other objects and advantages of the instant invention, as well as the invention itself, reside in the combinations of elements, arrangements of parts and features of construction and operation, all as will be more fully pointed out hereinafter and disclosed in the accompanying drawings wherein there is shown a preferred embodiment of this inventive concept.

In the drawing:

FIGURE 1 is a top plan view of the fishing lure of the instant invention;

FIGURE 2 is a side elevational view of the fishing lure of FIGURE 1;

FIGURE 3 is a longitudinal cross-sectional view of the fishing lure of FIGURES 1 and 2, taken substantially along line 3—3 of FIGURE 1 viewing in the direction of the arrows;

FIGURE 4 is a transverse cross-sectional view of the fishing lure of the instant invention taken substantially along line 4—4 in FIGURE 3 as viewed in the direction of the arrows;

FIGURE 5 is another longitudinal cross-sectional view of the fishing lure of the instant invention taken substantially along line 5—5 of FIGURE 3 as viewed in the direction of the arrows; and FIGURE 6 is a transverse cross-sectional view of another embodiment of the fishing lure of the instant invention similar to FIGURE 4 showing another mode of construction.

Referring now to the drawing in detail, wherein like reference characters designate like elements throughout the several views thereof, there is indicated generally at 10 the fishing lure of the instant invention having a body shown generally at 12 made of any convenient material, such as plastic, wood, metal, cork or the like, but which is preferably a molded plastic material, configured to simulate a minnow. Body 12 forms a peripheral bead 14 adjacent the forward end of lure 10 which carries a pair of simulated eyes 16 which aid in the simulation of lure 10 as a minnow. A bail 18 is affixed to the forward end of body 12 by a pair of frictional fasteners 20, such as rivets or the like with a stub shaft 22 being rotatably mounted in the bight of bail 18 extending along the longitudinal axis of body 12. A propeller shown generally at 24 may be rotatably mounted about shaft 22 to produce a flashing effect to attract fish with shaft 22 carrying an eye 26 for attachment to a leader or fishing line.

At the rearward end of lure 10, body 12 forms a horizontal slot 28 which carries a tongue 30 of a simulated fish tail 32 with a rivet 34 acting as a pivot pin about which tail 32 may oscillate. Extending along the under side of body 12 are a plurality of U-shaped brackets 36 secured to body 12 by suitable frictional fasteners 38, such as nails, screws, rivets or the like. As illustrated in FIGURE 2, some of brackets 36 carry fish hooks 40 while the rearmost bracket 36 carries a line 42 which may carry a sinker, fish hook or the like.

The sound creating components of lure 10 include a longitudinal passageway shown generally at 44 formed in body 12 and having an inlet 46, an enlarged segment 48, rectangular or rectilinear in cross section, adjacent the forward end of body 12 and a plurality of outlet apertures 50 adjacent the tail of lure 10 with a protuberance 49 forwardly of segment 48 insuring the flow of water above the axis of rotation of a paddle wheel 52. Fan or paddle wheel shown generally at 52 is rotatably mounted in rectilinear segment 48 of passageway 44 and is illustrated as including a pair of space circular plates 54 connected together by a hub 56 from which radially extends a plurality of paddle blades 58. Hub 56 receives a shaft 60 which extends beyond the lateral extent of paddle wheel 52 and is journalled in body 12 transversely of longitudinal passageway 44. It will be seen that plates 54 are spaced close to rectilinear segment 48 to insure that water passing therethrough contacts blades 58.

As may be see in FIGURE 4, body 12 is illustrated as molded into two vertically spaced segments 62, 64 which cooperate to form a pair of aligned bushings 66 receiving shaft 60. Paddle wheel 52 may be inserted in passageway 44 prior to the fastening together of upper and lower segments 62, 64 which may be accomplished by any suitable means. It will be apparent that the pulling of lure 10 through a body of water will result in the passage of the water through passageway 44 thereby rotating paddle wheel 52 in a clockwise direction as may be seen in FIGURE 3.

In the interests of manufacturing simplicity, body 12 may be formed as two horizontally spaced segments 80, 82 separated by a vertical line. In such event, only one circular plate 84 will be needed with shaft 86 extending from hub 88 on the opposite side of plate 84. Only segment 82 of body 12 is made with a bushing to receive shaft 86 with plate 84 supporting the opposite side of fan 52.

A resilient metal strip or vibratable reed 68 is affixed at one end thereof by conventional fastening means 70 to body 12 parallel to the axis of passageway 44 such that the free end of reed 68 lies in the path of blades 58 of paddle wheel 52. It will be seen that the passage of water through lure 10 will rotate paddle wheel 52 as previously mentioned with each of blades 58 strumming or striking reed 68 during each cycle of rotation. It will be apparent, therefore, that the need for an intermediate corrugated wheel mounted on a longitudinally extending shaft is unnecessary with the construction of the fishing lure of the instant invention, thereby lessening the cost and enhancing the simplicity of the instant invention.

In order to prevent foreign matter from passing through passageway 44 and fouling paddle wheel 52 or reed 68, a strainer shown generally at 72 is mounted to cover inlet 46 of passageway 44 thereby deflecting large particles away from passageway 44. Strainer 72 is constructed as a cap having a flat forward plate 74 and rearwardly extending peripheral flange 76 seated on a suitable ledge 78 formed at the forward end of body 12. Plate 74 provides a plurality of apertures 79 through which water may pass as lure 10 is pulled through the water and constitutes a foraminous member.

It is now seen that there is herein provided an improved sound emitting fishing lure having all of the objects of the instant invention and others, including many advantages of great practical utility and commercial importance.

Since many embodiments may be made in the instant inventive concept, and since many modifications may be made of the embodiment hereinbefore shown and described, it is understood that the foregoing description is to be interpreted merely as illustrative and not in a limiting sense.

I claim:

1. A sound emitting artificial lure for fishing comprising a body having a longitudinal substantially straight passage extending therethrough to provide a flow of water through said body when said lure is moved through the water, said passage having an enlarged segment in the lower portion thereof, a paddle wheel in the enlarged segment of said passage with the upper portion thereof extending into and filling said passage, a shaft extending transversely in said body and through said paddle wheel mounting said wheel for rotation in said passage upon flow of water therethrough, said shaft lying in an approximate plane of the bottom of said passage outside the enlarged segment thereof, a vibrating reed having one end thereof affixed to said body in said passage and the other end positioned in the path of movement of the paddle wheel for direct contact therewith for producing a sound wave, and a fish hook carried by the body.

2. The fishing lure of claim 1 wherein the vibratable reed extends parallel to the longitudinal passageway.

3. The fishing lure of claim 2 wherein the inlet end of the passageway is covered by a foraminous member.

4. The fishing lure of claim 3 wherein the body simulates a minnow and further comprising a tail pivotally connected to the body for movement when the lure passes through a body of water.

References Cited

UNITED STATES PATENTS

| | | | |
|---|---|---|---|
| 2,600,437 | 6/1952 | Siepe | 43—42.03 |
| 2,952,935 | 9/1960 | Jordan | 43—26.2 |
| 2,977,705 | 4/1961 | Busnel | 43—17 |
| 2,999,329 | 9/1961 | Pankuch | 43—26.2 |
| 3,296,733 | 1/1967 | McLean | 43—42.06 |

SAMUEL KOREN, *Primary Examiner.*

DANIEL J. LEACH, *Assistant Examiner.*

U.S. Cl. X.R.

43—42.17, 42.31